United States Patent
Natsume

(10) Patent No.: US 8,674,595 B2
(45) Date of Patent: Mar. 18, 2014

(54) VEHICULAR LAMP INCLUDING PLANAR LIGHT SOURCE

(75) Inventor: Kazunori Natsume, Shizuoka (JP)

(73) Assignee: Koito Manufacturing Co., Ltd. (JP)

(*) Notice: Subject to any disclaimer, the term of this patent is extended or adjusted under 35 U.S.C. 154(b) by 0 days.

(21) Appl. No.: 13/569,368

(22) Filed: Aug. 8, 2012

(65) Prior Publication Data

US 2013/0049570 A1    Feb. 28, 2013

(30) Foreign Application Priority Data

Aug. 22, 2011    (JP) .................................. 2011-180786

(51) Int. Cl.
*H01J 1/62*    (2006.01)
*F21V 9/16*    (2006.01)
*H05B 33/00*   (2006.01)

(52) U.S. Cl.
USPC ............. 313/498; 362/84; 362/103; 362/496; 313/512

(58) Field of Classification Search
USPC ..................... 313/498, 511, 512; 362/84, 103
See application file for complete search history.

(56) References Cited

U.S. PATENT DOCUMENTS 7,364,315 B2 *   4/2008  Chien ........................... 362/84
2001/0053082 A1 * 12/2001  Chipalkatti et al. .......... 362/496

FOREIGN PATENT DOCUMENTS

JP    2002133915        5/2002
JP    2004126074 A  *   4/2004

* cited by examiner

*Primary Examiner* — Joseph L Williams
(74) *Attorney, Agent, or Firm* — Cantor Colburn LLP

(57) ABSTRACT

Provided is a vehicular lamp including a planar light source. The planar light source made of a flexible band-type light-emitting material is provided within a lamp chamber formed between a housing and a transparent cover. The band-type light-emitting material of the planar light source is bent along a longitudinal direction such that a first light-emitting surface faces the rear side of the vehicle and a second light-emitting surface faces the lateral side of the vehicle. In particular, the first and second light-emitting surfaces are alternately formed in parallel in the planar light source, and the angle formed between the first and second light-emitting surfaces is set to be obtuse such that light from one light-emitting surface is not incident to other light-emitting surface. An organic EL formed by sealing an organic light-emitting layer using a flexile transparent resin is used as the band-type light-emitting material.

16 Claims, 5 Drawing Sheets

VEHICULAR LAMP INCLUDING PLANAR LIGHT SOURCE

CROSS-REFERENCE TO RELATED APPLICATIONS

This application is based on and claims priority from Japanese Patent Application No. 2011-180786, filed on Aug. 22, 2011, with the Japanese Patent Office, the disclosure of which is incorporated herein in its entirety by reference.

TECHNICAL FIELD

The present disclosure relates to a vehicular lamp including a planar light source composed of a flexible band-type light-emitting material.

BACKGROUND

Conventionally, a technique in which a surface light-emitting body is used as a light source has been proposed so as to make a vehicular lamp to be thinner and smaller. For example, Japanese Patent Application Laid-Open No. 2002-133915 discloses a rear combination lamp in which a surface light-emitting body composed of an organic electro luminescence (EL) is provided within a lamp chamber between a housing and a transparent cover, and light from the surface light-emitting body penetrates through the transparent cover and is emitted into the rear side of a vehicle.

SUMMARY

The conventional vehicular lamp uses a surface light-emitting body having a glass sealed structure as a light source, and therefore, the light source has to be divided into plural parts depending on the shape of the lamp. For example, in case of a vehicular lamp 51 with a shape as illustrated in FIG. 7, it is need to divide a light source 53 into three sheets to dispose the three sheets of surface light-emitting bodies 54 in different heights such that a light-emitting surface faces the rear side of a vehicle-body 52.

For the reason, the number of the components, such as a bezel 55 that maintains the surface light-emitting body, an extension 56 that blocks a gap, and an electric wiring necessary for every surface light-emitting body, is increased. In order to distribute the light from the light source 53 toward the lateral side of the vehicle-body 52, a surface light-emitting body facing the lateral side is further provided in addition to the surface light-emitting body facing the rear side, and as a result, there is a problem in that the number of components is increased.

The object of the present disclosure is to provide a vehicular lamp in which a light source thereof is not divided into plural parts in order to reduce the number of components, and light from a single light source can be distributed toward a forward-rearward direction and a lateral direction of a vehicle.

In order to solve the afore-mentioned problems, the present disclosure provides a vehicular lamp as described below:

(1) A vehicular lamp in which a planar light source formed with a flexible band-type light-emitting material is provided within a lamp chamber formed between a lamp housing and a transparent cover. The band-type light-emitting material is bent along a longitudinal direction such that a first light-emitting surface faces the forward-rearward direction of a vehicle and a second light-emitting surface faces the lateral direction of the vehicle.

(2) A vehicular lamp in which the first light-emitting surface and the second light-emitting surface are alternately formed in parallel in the planar light source.

(3) A vehicular lamp in which the angle formed between the first light-emitting surface and the second light-emitting surface is an obtuse angle.

(4) A vehicular lamp in which a band-type light-emitting material is an organic EL which is formed by sealing an organic light-emitting layer with a flexible transparent resin.

(5) A vehicular lamp in which at least one of a first light-emitting surface and a second light-emitting surface emits light having a color different from other light-emitting surface.

The vehicular lamp according to the present disclosure uses a bendable band-type light-emitting material as a planar light source, and thus, the light source is not necessary to be divided into plural parts. Accordingly, the number of components can be reduced and the light from a single light source can be distributed toward the lateral direction of the vehicle as well as the forward-rearward direction thereof.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Figure 5:
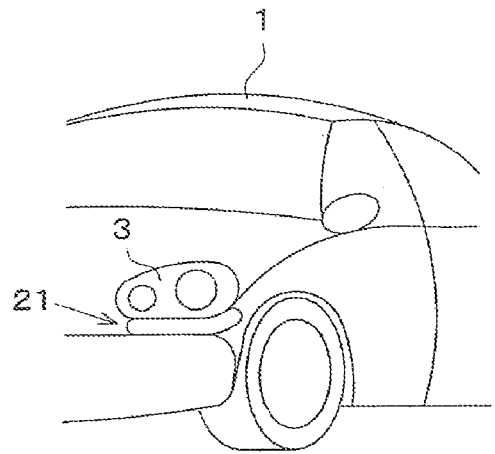
FIG. 5 is a perspective view illustrating a front part of a vehicle-body according to a second exemplary embodiment of the present disclosure.
Figure 6:
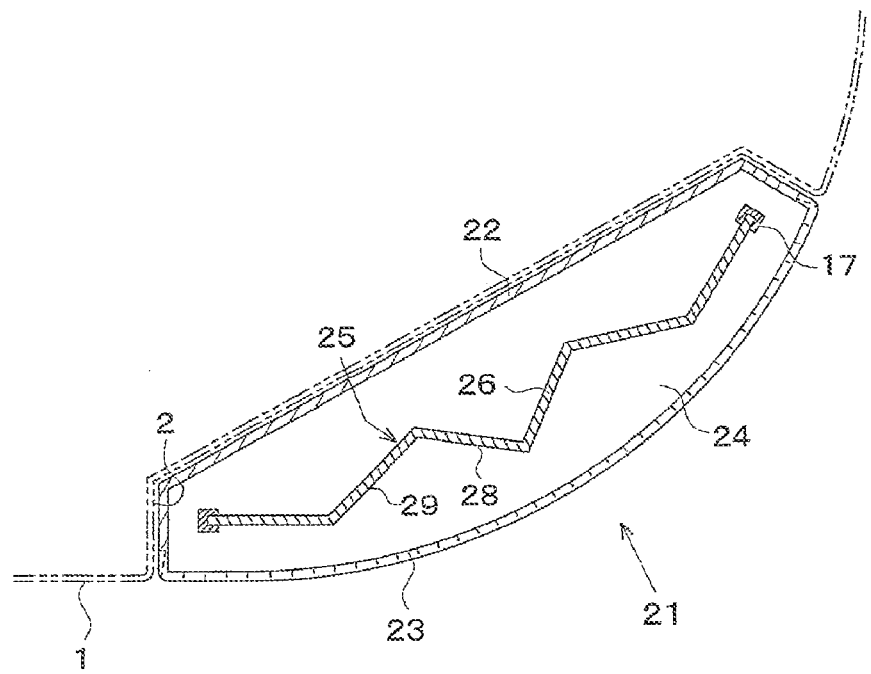
FIG. 6 is a horizontal cross-sectional view illustrating a clearance lamp at the front part of the vehicle-body.
Figure 7:
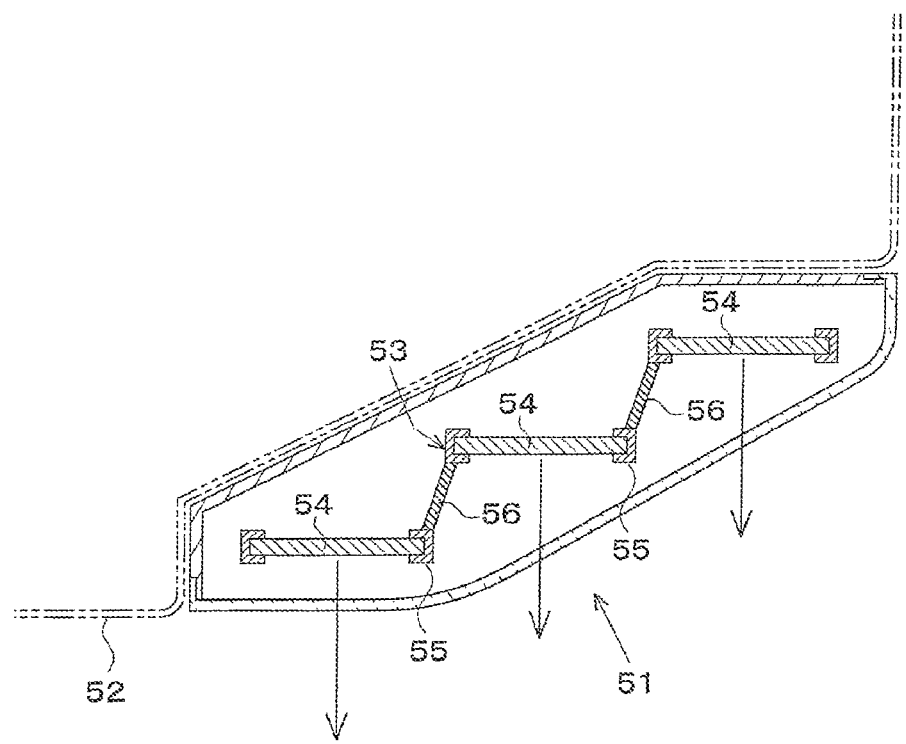
FIG. 7 is a horizontal cross-sectional view illustrating a conventional vehicular lamp.

Hereinafter, the exemplary embodiments of the present disclosure will be described with reference to the drawings. FIGS. 1 to 4 illustrate a first exemplary embodiment in which the present disclosure is embodied by a rear combination lamp of a rear part of a vehicle-body. FIGS. 5 and 6 illustrate a second exemplary embodiment in which the present disclosure is embodied by a clearance lamp below a head lamp. In each of the exemplary embodiments, the same or similar members are represented by the same numeral references in the drawings.

First Exemplary Embodiment

Figure 1:
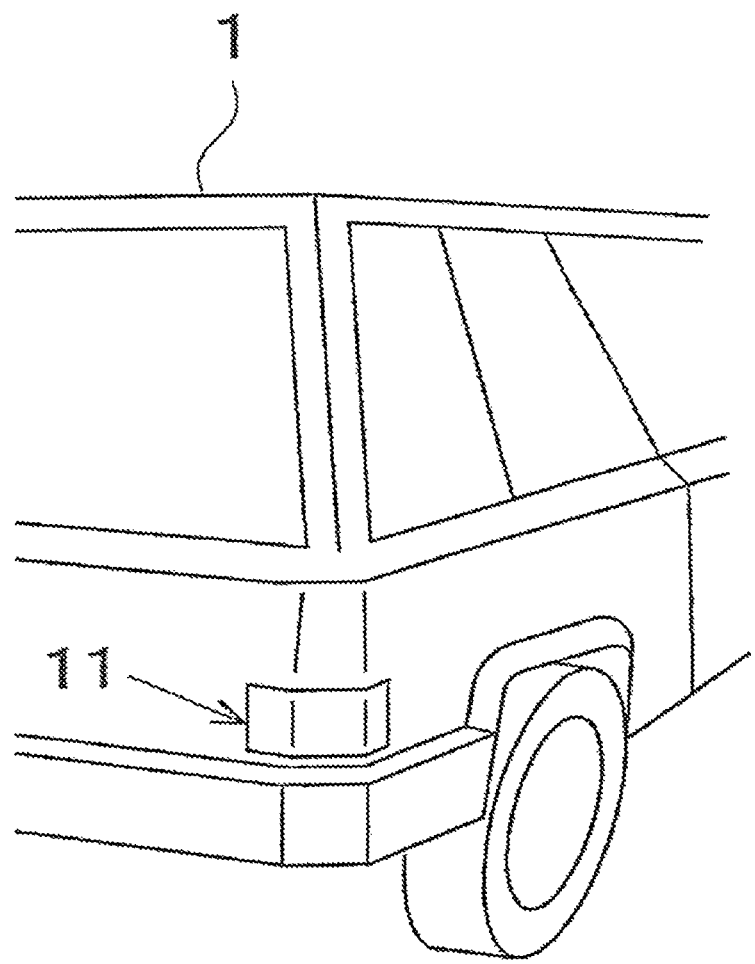
FIG. 1 is a perspective view illustrating a rear part of a vehicle-body according to a first exemplary embodiment of the present disclosure.
Figure 2:
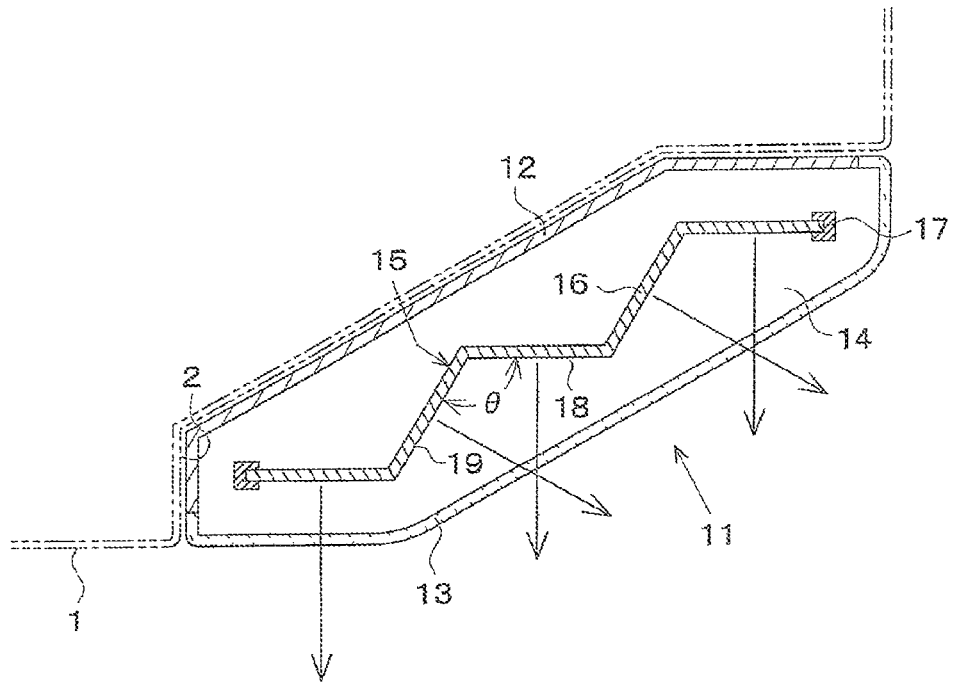
FIG. 2 is a horizontal cross-sectional view illustrating a rear combination lamp at the rear part of the vehicle-body.

A rear combination lamp 11 as illustrated in FIG. 1 is provided at a rear corner portion of a vehicle-body 1, and is configured to distribute light from a planar light source to the lateral direction of a vehicle as well as the rear direction of the vehicle (e.g., the rear side of the forward-rearward direction of the vehicle). As illustrated in FIG. 2, a housing 12 of the rear combination lamp 11 is attached to a concave portion 2 of the vehicle-body 1 and a transparent cover 13 is mounted to the housing 12. A lamp chamber 14 is formed between the transparent cover 13 and the housing 12, and a planar light source 15 is provided within the lamp chamber 14.

The planar light source 15 is formed of an organic EL of band-type light-emitting material 16 lengthily from side to side, and both ends thereof are maintained in the housing 12 using holders 17. The band-type light-emitting material 16 is bent several times along the longitudinal direction, and a first light-emitting surface 18 facing the rear direction of the vehicle and a second light-emitting surface 19 facing the lateral direction of the vehicle are alternately formed in parallel. An angle (θ) formed by the first and second light-emitting surfaces 18, 19 is set to be obtuse such that light from a light-emitting surface is not incident to an adjacent light-emitting surface.

Figure 3:
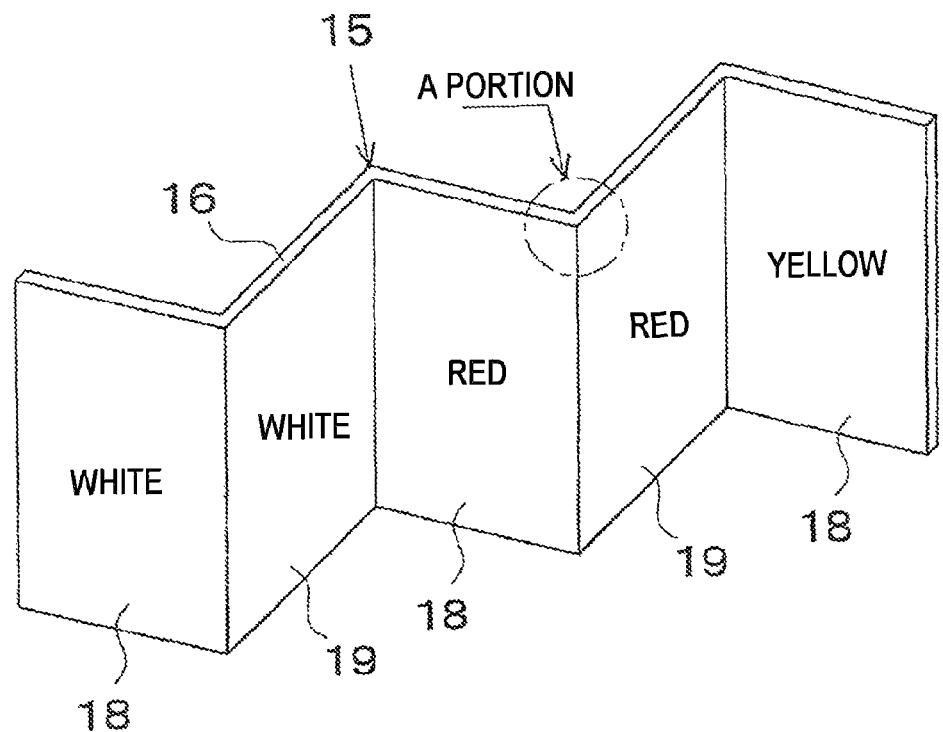
FIG. 3 is a perspective view illustrating a planar light source of the rear combination lamp.
Figure 4:
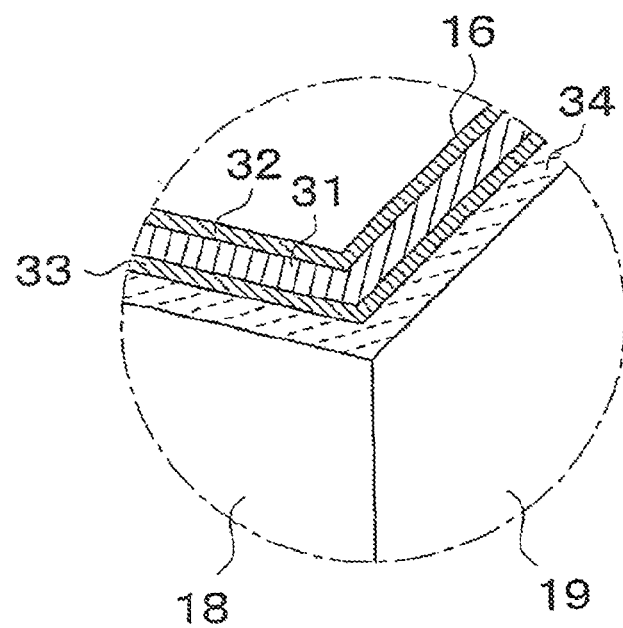
FIG. 4 is an enlarged view of A portion in FIG. 3, which illustrates a band-type light-emitting material of the planar light source.

As illustrated in FIGS. 3 and 4, an organic EL is configured by stacking a rear side electrode 32, a transparent electrode 33, and a transparent substrate 34 in a light-emitting layer 31. The transparent substrate 34 is formed of a flexible transparent resin which seals the organic light-emitting layer 31. The band-type light-emitting material 16 is configured to emit a white light for a back lamp, a red light for a tail/stop lamp, and a yellow light for a turn signal lamp from the different light-emitting surfaces 18, 19, respectively, by replacing the organic material of the organic light-emitting layer 31 or using a color filter.

Therefore, according to the rear combination lamp 11 in the first exemplary embodiment, the planar light source 15 can be made of a one sheet of band-type light-emitting material 16, and thus, it is not necessary to divide a light source as in the related art. As a result, it is possible to configure the entire lamp with a low cost using less number of components. The light emitted from the organic EL can be distributed to the lateral direction of the vehicle as well as the rear direction of the vehicle only by a simple method in which the band-type light-emitting material 16 is bent according to an appearance of the vehicle-body 1, thereby increasing the safety.

Second Exemplary Embodiment

A clearance lamp 21 in the second exemplary embodiment, as illustrated in FIG. 5, is provided below a head lamp 3, and is configured to distribute light from a planar light source to the lateral direction of a vehicle as well as the front direction of the vehicle (e.g., the front side of the forward-rearward direction of the vehicle). As illustrated in FIG. 6, the clearance lamp 21 includes a planar light source 25 within a lamp chamber 24 between a housing 22 and a transparent cover 23. The planar light source 25, as in the first exemplary embodiment, is formed of an organic EL of band-type light-emitting material 26 lengthily from side to side. The transparent cover 23 is formed with a curve in succession to the curve of the vehicle-body 1.

The band-type light-emitting material 26 is bent several times along the longitudinal direction, and thus, a first light-emitting surface 28 facing the front direction of the vehicle and a second light-emitting surface 29 facing the lateral direction of the vehicle are formed alternately in the planar light source 25. The first and second light-emitting surfaces 28, 29 are bent with the numbers, angles and lengths according to the curvature of the transparent cover 23. As a result, according to the clearance lamp 21 in the second exemplary embodiment, the same actions and effects as in the first exemplary embodiment can be expected in the vehicular lamp of the front part of the vehicle-body.

The present disclosure is not limited to the vehicular lamps of the first and second exemplary embodiments as described above and can be modified with an appropriate change of the shape or the configuration of each parts without departing from the spirit of the present disclosure. For example, the present disclosure may be applied to a indicating lamp of the front part or the rear part of the vehicle-body.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicular lamp comprising:
a planar light source of a single sheet of a flexible band-type light-emitting material provided within a lamp chamber formed between a lamp housing and a transparent cover,
wherein the band-type light emitting material of the planar light source is bent more than two times along a longitudinal direction of the planar light source such that at least two of first light-emitting surfaces face a forward-rearward direction of a vehicle and at least two of second light-emitting surfaces face a lateral direction of the vehicle.

2. The vehicular lamp of claim 1, wherein one of the first light-emitting surfaces and one of the second light-emitting surfaces are alternately formed with each other at least two times such that two adjacent first light-emitting surfaces are formed in substantially parallel and two adjacent second light-emitting surfaces are formed in substantially parallel in the planar light source.

3. The vehicular lamp of claim 1, wherein the angle formed between one of the first light-emitting surfaces and one of the second light-emitting surfaces is an obtuse angle such that light from the planar light source is not incident to an adjacent light-emitting surface.

4. The vehicular lamp of claim 2, wherein the angle formed between one of the first light-emitting surfaces and one of the second light-emitting surfaces is an obtuse angle such that light from the planar light source is not incident to an adjacent light-emitting surface.

5. The vehicular lamp of claim 1, wherein the band-type light-emitting material is an organic EL which is formed by sealing an organic light-emitting layer using a flexible transparent resin.

6. The vehicular lamp of claim 2, wherein the band-type light-emitting material is an organic EL which is formed by sealing an organic light-emitting layer using a flexible transparent resin.

7. The vehicular lamp of claim 3, wherein the band-type light-emitting material is an organic EL which is formed by sealing an organic light-emitting layer using a flexible transparent resin.

8. The vehicular lamp of claim 4, wherein the band-type light-emitting material is an organic EL which is formed by sealing an organic light-emitting layer using a flexible transparent resin.

9. The vehicular lamp of claim 1, wherein at least one of the first light-emitting surface and the second light-emitting surface emits light having a color that is different from other light-emitting surface.

10. The vehicular lamp of claim 2, wherein one of the first light-emitting surfaces and one of the second light-emitting surfaces emit light having colors different from each other.

11. The vehicular lamp of claim 3, wherein one of the first light-emitting surfaces and one of the second light-emitting surfaces emit light having colors different from each other.

12. The vehicular lamp of claim 4, wherein one of the first light-emitting surfaces and one of the second light-emitting surfaces emit light having colors different from each other.

13. The vehicular lamp of claim 5, wherein one of the first light-emitting surfaces and one of the second light-emitting surfaces emit light having colors different from each other.

14. The vehicular lamp of claim 6, wherein one of the first light-emitting surfaces and one of the second light-emitting surfaces emit light having colors different from each other.

15. The vehicular lamp of claim 7, wherein one of the first light-emitting surfaces and one of the second light-emitting surface emit light having colors different from each other.

16. The vehicular lamp of claim 8, wherein one of the first light-emitting surfaces and one of the second light-emitting surfaces emit light having colors different from each other.

* * * * *